Oct. 9, 1956 A. B. SKROMME ET AL 2,766,075
LEVELER MEANS FOR CROP-HANDLING MACHINE
Filed March 10, 1955
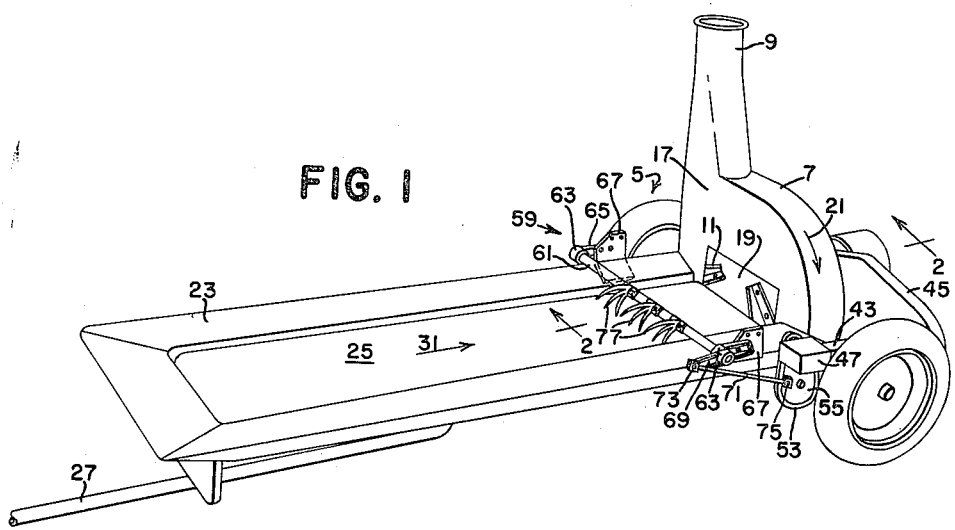
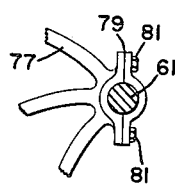
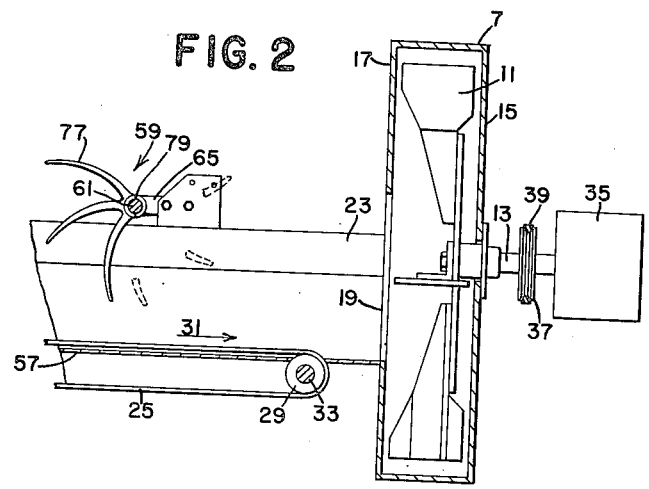
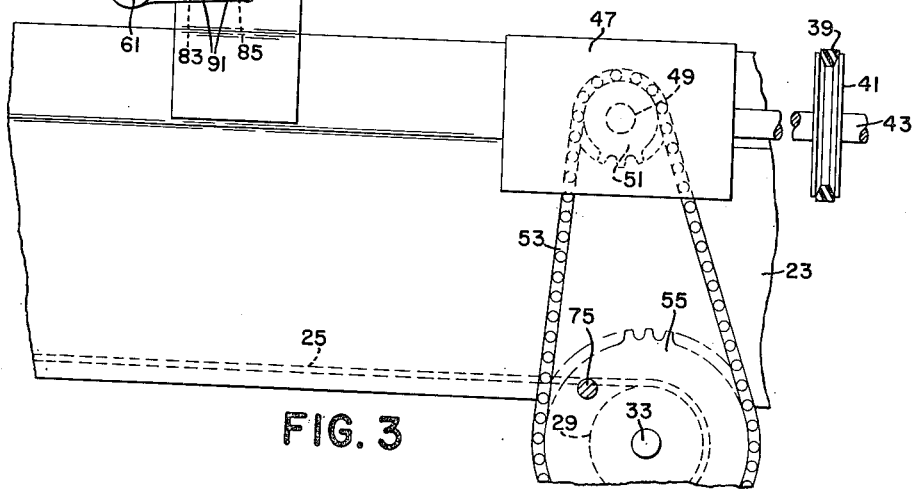

United States Patent Office 2,766,075
Patented Oct. 9, 1956

2,766,075

LEVELER MEANS FOR CROP-HANDLING MACHINE

Arnold B. Skromme and Neil W. Summers, Ottumwa, Iowa, assignors to Deere Manufacturing Co., Dubuque, Iowa, a corporation of Iowa Application March 10, 1955, Serial No. 493,537

6 Claims. (Cl. 302—37)

This invention relates to a crop-handling means and more particularly to a feeding or leveling means for leveling and agitating the crops as fed by a conveyor or the like to a rotor or equivalent means for elevating the crops.

A conventional crop-handling machine of the general character referred to comprises an upright rotor housing having one of its radial walls formed with an inlet opening from which a horizontal feed table extends forwardly. A conveyor is mounted in the feed table for movement rearwardly or toward the feed inlet opening, crops having been dumped onto the conveyor from a wagon or other source. It is a relatively common occurrence in the handling of some crops that the crops on the conveyor are received in such quantity as to pile up at the feed opening in such manner as to prevent efficient operation of the machine. It has heretofore been necessary for an operator to stand by with a pitchfork or other means to level the crops on the conveyor.

Various power-operated devices have been tried in an attempt to solve the problem, but these have in the main consisted of members movable in circular or ellipsoidal paths, and it is found that these produce merely agitating effects and have no leveling function. According to the present invention, the solution to the problem is found in a leveler comprising a cross shaft on which is mounted one or more crop-engaging elements. The shaft is driven in such manner as to oscillate through a fixed angular range so that the crop-engaging elements move toward the feed opening on one stroke and away from the feed opening on the other stroke. On the first stroke, feeding is assisted and on the return stroke the crop is leveled. Hence, each charge of material is of the requisite size for efficient handling by the rotor or blower. The invention features further the provision of means for adjusting the height of the leveler relative to the conveyor so as to accommodate crops of different feeding characteristics. A further feature of the invention resides in novel driving means whereby drive for oscillating the leveler may be taken from an existing part of the machine.

The foregoing and other important objects and desirable features inherent in and encompassed by the invention will become apparent as a preferred embodiment of the invention is disclosed in detail in the following specification and accompanying sheet of drawings, the several figures of which will be described immediately below.

Fig. 1 is a perspective view of a typical crop-handling machine, equipped with the preferred embodiment of the leveler.

Fig. 2 is a fragmentary sectional view, as seen substantially along the line 2—2 of Fig. 1, showing the relationship between the leveler, the conveyor and the receiving rotor housing.

Fig. 3 is a fragmentary side elevational view, further enlarged and partly in section, showing the adjustable mounting for the leveler shaft as related to the leveler and conveyor drive.

Fig. 4 is a fragmentary view, partly in section, showing the mounting of a leveler element.

The crop-handling machine chosen for the purposes of illustration comprises a wheeled carriage 5 between the wheels of which is supported an upright blower rotor housing 7 having a tangential discharge duct 9 through which material is discharged by a blower rotor 11 journaled on a horizontally rearwardly extending rotor shaft 13. The housing 7 has a rear radial wall 15 in which the rotor shaft 13 is journaled. In addition, the housing 7 has a front radial wall 17 in which is formed a feed inlet opening 19. The rotor 11 rotates in the direction of the arrow 21 (Fig. 1) and crops fed through the inlet opening 19 are conveyed by the rotor 11 upwardly and outwardly through the discharge duct 9, it being understood that the duct 9 normally has connected thereto a stack extension for the purpose of transferring the material to a silo or other convenient storage building.

Extending forwardly from the front radial side or face 17 of the rotor housing 7 is an elongated horizontal feed table 23 having laterally spaced apart, opposite flared sides between which is carried an endless conveyor 25. A draft tongue 27 is appropriately connected to the underside of the feed table and extends forwardly for facilitating moving of the machine. When the machine is in use, it remains stationary and crop-loaded vehicles are driven to it and the crops are dumped onto the conveyor 25.

The conveyor shown here is of the endless-belt type mounted on front and rear rollers, only the front one of which appears at 29. The conveyor is driven in such manner that its upper run moves rearwardly or in the direction of the arrow 31 (Figs. 1 and 2). The front conveyor roller 29 is carried on a transverse horizontal shaft 33 which forms part of the drive means to be presently described.

Input for the rotor shaft 13 is accomplished by means of a belt pulley 35 about which is trained a flat belt driven from the belt pulley of a tractor (not shown) in the conventional manner. The speed of the rotor is relatively high, being on the order of 1000 R. P. M.

The drive means further includes a V-belt pulley 37 keyed to the rotor shaft 13 between the housing 7 and the belt pulley 35. The V-belt pulley carries a V-belt 39 which is trained additionally about a driven V-belt pulley 41 that is keyed to the forward end portion of a longitudinally extending power shaft 43, the shaft 43 being spaced laterally from and paralleling the rotor shaft 13 (Fig. 3). In Fig. 1, the portion of the drive means just described is enclosed within a safety shield 45.

The front end of the shaft 43 enters a gear box 47, appropriately fixed to one side of the feed table 23 adjacent to the rotor housing 7. The gear box contains appropriate bevel gears (not shown) for transmitting power from the shaft 43 to a transverse drive shaft 49. A sprocket 51 on the inner end of the shaft 49 serves, by means of a chain 53, to drive a larger sprocket 55 which constitutes a rotary member keyed to the projecting end of the conveyor front roller shaft 33. The drive mechanism, just described, furnishes power for both the rotor 11 and the conveyor 25. The speed reduction is such that the speed of the shaft 33 is on the order of 167 R. P. M., which is relatively unimportant except to establish the fact that the linear travel of the conveyor 25 is relatively slow.

Since the conveyor 25 is of the over-shot type, the feed table 23 has a bottom 57 disposed just below the upper run of the conveyor, which is not unconventional.

According to the present invention, the feeding of crops from the upper run of the conveyor 25 to the rotor 11 via the feed inlet opening 19 in the rotor housing is facilitated by the provision of combination leveler and agitating means, designated in its entirety by the numeral 59, The preferred form of leveler means shown comprises a transverse leveler shaft 61. This shaft is journaled at opposite ends by bearings 63, each bearing including an arm 65 mounted on a supporting bracket 67 in an adjustable manner to be presently described. Each bracket 67 is affixed to the respective side of the feed table 23 in any appropriate manner, as by welding. Thus, the brackets 67 stand up from the respective sides of the feed table and carry the bearings 63 which in turn carry the leveler shaft 61.

The shaft 61 projects at one end beyond the proximate bearing and has rigidly fixed thereto a crank arm 69. This crank arm is substantially in fore-and-aft alinement with the rotary member or sprocket 55 on the front conveyor shaft 33. Power-transmitting means in the form of a pitman 71 is connected at one end, at 73, to the drive arm 69, and at its other end to a crank pin 75 on the rotary member or sprocket 55.

The leveler shaft comprises a plurality (here three) of leveler elements 77, each element being in the form of a three-pronged fork, each tine or leg of which is curved or hooked rearwardly or toward the feed inlet opening 19. Each tine therefore has a concave rear portion and a convex front portion. The angular range of oscillation of the shaft 61 as effected by the pitman drive 55—75—71—69 is represented in Fig. 2, wherein the dotted portions indicate respectively the maximum positions of the three leveler fingers on their feeding or rearward stroke. The maximum position of the fingers in the other direction or at the other end of the angular range is indicated in full lines in Figs. 1 and 2. Thus, as crops are carried along by the upper run of the conveyor 25, they are engaged by the oscillating leveler elements 77 and these elements, on their feeding stroke, serve to break up or agitate the crops as well as to assist them along their path of movement. However, since the leveler means is not rotary, but instead oscillates, it does not merely carry or wrap the crops. Nor does it permit an excess of crops to pass beneath the shaft 61, since the leveler means on their forward or leveling stroke serve to level off whatever crops may have piled up at the shaft 61. In addition to the action of the elements 77, the shaft 61 serves as a means for leveling the crops and consequently preventing relatively large accumulations of crops from entering the feed inlet opening 19 and possibly slugging the rotor 11. Because of the relatively slow R. P. M. of the rotary member or sprocket 55, the action of the leveler is adequate to level and agitate but is not so rapid as to create undesirable feeding conditions.

Each leveler element 77 is mounted on the shaft 61 by a releasable clamping connection including a split hub and bearing cap assembly 79, best shown in Fig. 4. The bearing cap may be removed, by removing cap screws 81, and any element may be readily removed and replaced or may be adjusted axially along the shaft 61.

As previously indicated, the height of the shaft 61 relative to the conveyor 25 may be adjusted. Figs. 1 and 2 show the lowest position, which lowest position is illustrated also in full lines in Fig. 3. In the preferred form of the invention, three positions are available, the lowest providing a distance on the order of five inches between the top of the conveyor and the lowermost fingers of the elements 77. In an intermediate position, the distance would be on the order of six and one-half inches and in the maximum position on the order of eight and one-half inches.

For the purpose of accomplishing this adjustment, each bracket 67 has four apertures 83, 85, 87 and 89 therein. The distance between the apertures 83 and 85 equals the distance between the apertures 85 and 87 and the distance between the apertures 87 and 89. Each bearing arm 65 is similarly apertured to receive bolts 91, the apertures in the arm being spaced apart on the order of any of the bracket aperture spacings as previously described. For example, in the lowermost position of the bearing arm 65, the apertures in the bearing arm are registered with the apertures 83 and 85 and the bolts 91 are used to secure the bearing in position. The maximum position is achieved by removing the left-hand bolt 91 (as seen in Fig. 3), pivoting the arm 65 about the other bolt 91 and replacing the first bolt through the bracket aperture 87. The intermediate position is accomplished by using the apertures 87 and 89, with the arm-fastening bolts 91 received therein. In each position of the bearing arm, mounted as described above, the axis of the shaft 61 lies on an arc having the front conveyor roller shaft 33 as its center. Consequently, adjustment of the leveler means is possible without in any way affecting the drive means.

It will be apparent from the foregoing that the leveler means may be provided as an attachment for machines already in existence, since, as will be clear, it is a relatively simple task to equip such machine with a rotary member such as the sprocket 55 in place of the original sprocket, the new sprocket having, of course, the crank pin 75 by means of which drive is transmitted to the leveler means 59. Of course, the leveler means could be built into the machine as regular equipment.

Various other features of the invention, not specifically enumerated herein, will undoubtedly occur to those versed in the art, as will numerous modifications and alterations in the preferred embodiment of the invention disclosed, all of which may be achieved without departing from the spirit and scope of the invention.

What is claimed is:

1. In a crop-handling machine having an upright blower housing coaxially journaling a blower rotor on a fore-and-aft horizontal axis and having a front radial wall formed with a feed inlet opening, a horizontal feed table extending forwardly from the housing front wall in register with the feed inlet opening opposite fore-and-aft sides between which is carried a rearwardly moving crop-carrying conveyor leading to the feed inlet opening, and drive means for the rotor and conveyor, the improvement comprising: a transverse leveler shaft disposed crosswise of the feed table above the conveyor and just ahead of the feed opening; bearing means mounted on the sides of the feed table and carrying the shaft for oscillation about a transverse horizontal axis; a crank arm fixed to one end of the shaft laterally outwardly of the feed table; rotary means journaled on the machine on an axis parallel to the shaft axis and drivingly connected to the drive means; a pitman connecting the rotary means to the crank arm for oscillating the shaft through a fixed angular range; and leveler means fixed to the shaft between the sides of the feed table for oscillation with the shaft and alternately rearwardly and forwardly over the conveyor, said leveler means being operative in its rearward movement to engage conveyor-carried crops for assisting the conveyor in feeding such crops to the inlet opening and being operative in its forward movement to engage and level conveyor-carried crops.

2. The invention defined in claim 1, in which: each bearing means has cooperative adjustable elements selectively operative to vary the height of the shaft above the conveyor among a plurality of shaft positions equidistant from the axis of the rotary means.

3. The invention defined in claim 1, in which: the leveler means comprises a plurality of leveler elements spaced apart axially on the leveler shaft, each element having a plurality of fingers projecting radially conveyor-ward.

4. The invention defined in claim 3, in which: each finger projects from the leveler shaft in rearwardly hooked fashion, having thereby a concave rear edge and a convex front edge.

5. The invention defined in claim 3, in which: each leveler element has a releasable hub receiving the leveler shaft and including clamp means selectively releasable to enable axial adjustment of the leveler element on said leveler shaft.

6. In a crop-handling machine having an upright blower housing coaxially journaling a blower rotor on a fore-and-aft horizontal axis and having a front radial wall formed with a feed inlet opening, a horizontal feed table extending forwardly from the housing front wall in register with the feed inlet opening opposite fore-and-aft sides between which is carried a rearwardly moving crop-carrying conveyor leading to the feed inlet opening and having a housing-proximate roller and a conveyor drive shaft projecting laterally outwardly at one side of the feed table, and drive means for the rotor and conveyor drive shaft, the improvement comprising: a transverse leveler shaft disposed crosswise of the feed table above the conveyor and just ahead of the feed opening; bearing means mounted on the sides of the feed table and carrying the leveler shaft for oscillation about a transverse horizontal axis; a crank arm fixed to the end of the leveler shaft at the side of the feed table at which the conveyor drive shaft projects; a rotary member fixed to the projecting end of the conveyor drive shaft; a pitman connecting the rotary member to the crank arm for oscillating the leveler shaft through a fixed angular range; and leveler means fixed to the leveler shaft between the sides of the feed table for oscillation with the leveler shaft and alternately rearwardly and forwardly over the conveyor, said leveler means being operative in its rearward movement to engage conveyor-carried crops for assisting the conveyor in feeding such crops to the inlet opening and being operative in its forward movement to engage and level conveyor-carried crops.

References Cited in the file of this patent

UNITED STATES PATENTS

| | | |
|---|---|---|
| 1,258,858 | Bell | Mar. 12, 1918 |
| 2,464,973 | Freiden | Mar. 22, 1949 |
| 2,678,239 | Heth | May 11, 1954 |